US009642477B2

United States Patent
Kontschak et al.

(10) Patent No.: US 9,642,477 B2
(45) Date of Patent: May 9, 2017

(54) MODULAR SUPPORT COLUMN

(71) Applicant: Mettler-Toledo (Albstadt) GmbH, Albstadt (DE)

(72) Inventors: Dieter Kontschak, Winterlingen (DE); Walter Holike, Geislingen (DE); Xinwei Su, Changzhou Jiangsu (CN); Edgar Kempf, Inzigkofen (DE)

(73) Assignee: METTLER-TOLEDO (ALBSTADT) GMBH, Albstadt (DE)

( * ) Notice: Subject to any disclaimer, the term of this patent is extended or adjusted under 35 U.S.C. 154(b) by 0 days.

(21) Appl. No.: 14/862,339

(22) Filed: Sep. 23, 2015

(65) Prior Publication Data

US 2016/0081494 A1    Mar. 24, 2016

(30) Foreign Application Priority Data

Sep. 24, 2014  (EP) .................... 14186073

(51) Int. Cl.
| | |
|---|---|
| *F16M 13/00* | (2006.01) |
| *A47F 9/04* | (2006.01) |
| *G06F 1/16* | (2006.01) |
| *F16M 11/22* | (2006.01) |
| *F16M 11/24* | (2006.01) |

(52) U.S. Cl.
CPC ............. *A47F 9/046* (2013.01); *F16M 11/22* (2013.01); *F16M 11/24* (2013.01); *G06F 1/16* (2013.01); *F16M 2200/065* (2013.01); *F16M 2200/08* (2013.01)

(58) Field of Classification Search
CPC .... A47F 5/04; Y10T 403/57; Y10T 403/5706; Y10T 403/5741; Y10T 403/5753
USPC ........ 248/65, 121, 125.7, 122.1, 159, 274.1, 248/276.1, 282.1; 174/95, 97; 348/836; 361/825; 439/210
See application file for complete search history.

(56) References Cited

U.S. PATENT DOCUMENTS 5,266,738 A  * 11/1993  MacVoy ................. E04H 12/08
174/45 R
5,906,284 A  *  5/1999  Hammerstrom ......... B25H 1/02
211/107

(Continued)

FOREIGN PATENT DOCUMENTS

| TW | 200925826 A | 6/2009 |
|---|---|---|
| WO | 2014/111941 A1 | 7/2014 |

*Primary Examiner* — Terrell McKinnon
*Assistant Examiner* — Michael McDuffie
(74) *Attorney, Agent, or Firm* — Standley Law Group LLP (57) ABSTRACT

A modular support column allows electrical signal- and power-transmitting lines between a data-processing device and an associated weighing device to be enclosed. The modular support column includes a foot module (5; 6), at least a primary pole module (10), at least one adapter module (20, 50), mechanical connector elements (70, 80) and fasteners (55, 75). The modular support column, when assembled, has a central axis (a) defining an axial direction. A first axial end (11) of the primary pole module is connected to the foot module which, in turn, is to a chassis base (4) of a weighing scale (3). A second axial end (12) is connected to the at least one adapter module. The mechanical connector elements and fasteners are also enclosed. Extension pole modules (40) and adapter modules (20, 50) can extend the modular support column.

14 Claims, 5 Drawing Sheets

(56) References Cited

U.S. PATENT DOCUMENTS

| | | | |
|---|---|---|---|
| 6,012,591 A * | 1/2000 | Brandenberg | A47B 9/14 211/26 |
| 6,086,028 A * | 7/2000 | Pfister | A47B 21/06 108/50.01 |
| 6,364,678 B1 * | 4/2002 | Hellwig | H02G 3/0493 439/207 |
| 6,419,511 B2 | 7/2002 | Lizell | |
| 6,669,639 B1 * | 12/2003 | Miller | A61B 8/00 600/443 |
| 6,953,355 B1 | 10/2005 | Lizell | |
| 7,246,780 B2 * | 7/2007 | Oddsen, Jr. | A47B 49/00 211/26 |
| 7,374,138 B2 * | 5/2008 | Marshall | A47F 7/00 108/49 |
| 7,626,120 B1 * | 12/2009 | Golden | H02G 3/185 174/135 |
| 8,254,092 B2 * | 8/2012 | Russell | F16M 11/04 248/125.7 |
| 8,310,468 B2 * | 11/2012 | Martin | F16M 11/08 248/274.1 |
| 8,424,822 B2 * | 4/2013 | Suda | F16M 11/04 248/131 |
| 8,640,998 B2 * | 2/2014 | Lau | F16M 11/04 248/121 |
| 8,717,506 B2 | 5/2014 | Austin et al. | |
| 9,433,282 B2 * | 9/2016 | Steelman | A47B 13/02 |
| 2002/0114663 A1 * | 8/2002 | Chung | A47G 33/04 403/300 |
| 2006/0102811 A1 * | 5/2006 | Musset | A61G 13/107 248/121 |
| 2006/0144612 A1 * | 7/2006 | Johansson | B60R 16/0215 174/95 |
| 2006/0158836 A1 * | 7/2006 | Phillips | F16M 11/00 361/679.22 |
| 2011/0108684 A1 | 5/2011 | Roessler | |
| 2013/0119219 A1 * | 5/2013 | Mifsud | F16M 13/022 248/276.1 |
| 2014/0070059 A1 * | 3/2014 | Vieira | F16M 11/041 248/122.1 |

\* cited by examiner

Fig. 5

MODULAR SUPPORT COLUMN

CROSS-REFERENCE TO RELATED APPLICATIONS

This application is entitled to benefit of a right of priority from European application 14186073.4, filed on 24 Sep. 2014, which is incorporated by reference as if fully recited herein.

TECHNICAL FIELD

The invention concerns a support column for LCD screens, keyboards, printers and other equipment typically associated with weighing scales and point-of-sale terminals in retail stores. The functions of such a support column are to hold the supported equipment units at the optimal respective working and/or viewing heights,—positions and—orientations for the store clerk and/or the customer. Similar setups where weighing scales are used with display panels, keyboards, printers, card readers etc. also exist in inventory management, warehousing, shipping and other industrial situations.

BACKGROUND ART

To accommodate different equipment combinations of scales, display screens, keyboards, printers, etc. as well as different layouts of store counters and checkout stations, suitable support stands for different installations could be custom-fabricated. However, a modular building-block system from which a support column can be assembled to meet the specific requirements of a given application appears to be preferable as a more cost-effective solution. Indeed, the present state of the art offers good examples of such modular support systems, which will be discussed below.

Food equipment, i.e. equipment used in the processing and handling of food products in industrial, commercial and institutional establishments, has to meet specific sanitary requirements, which are set down for example in the U.S. standard "NSF/ANSI 2—Food Equipment". These sanitary aspects include, among others, the general ease of cleaning (general sanitation) and also specific details such as radii of internal angles and corners, exposed joints and seams, fasteners such as screws and rivets, and many more.

Consequently, modular adaptability as well as compliance with sanitary requirements and standards are important criteria in selecting a support column or post for display screens, keyboards and printers for use with a weighing scale and/or point-of-sale terminal in a retail food store, particularly on a store counter where meat, fish, poultry cheese and similarly sensitive food products are handled, packaged and sold to order.

An electronic video display mount for use at point-of-sale terminals is described in U.S. Pat. No. 8,717,506. It includes a substantially vertical tubular mounting pole attached to a pole foot and carrying, by way of a vertically adjustable connecting collar, a horizontal slide arm to which the display panel is connected. The position of the display panel can be adjusted by changing the vertical distance of the connecting collar from the pole foot and by sliding the panel horizontally on the slide arm. The range of vertical adjustment can be extended with one or more additional tubular sections designed as modules with mating connections. However, at least the video display mount proposed in U.S. Pat. No. 8,717,506 does not appear to be designed to meet the aforementioned food equipment standard NSF/ANSI 2. In particular the mechanism of the horizontal slide arm gives the impression of being difficult to clean.

A modular mounting system for retail terminal equipment such as touchscreen panels, printers and credit card readers is offered under the trade name of Spacepole® by Ergonomic Solutions International Ltd, B2 Longmead Business Centre, Blenheim Road, Epsom KT19 9QQ, United Kingdom. The building blocks of this system include tubular poles, swing arms, tilt hinges, and associated fastening and connecting hardware.

The aforementioned video display mount according to U.S. Pat. No. 8,717,506 as well as the SPACEPOLE® modular mounting system are described as being in compliance with the so-called VESA mounting interface standard, which is the name of a family of standards defined by the Video Electronics Standards Association (VESA) for mounting flat panel monitors, TVs, and other displays to stands or walls. However, insofar as these equipment mounts might be considered for use on retail counters for goods such as meat, poultry and seafood, it appears at least from the descriptions and illustrations that the aspects of U.S. standard "NSF/ANSI 2—Food Equipment" have not been addressed.

A major difficulty in designing a modular mounting system that also meets the sanitary requirements of the NSF/ANSI 2 standard lies in the joints and connections which necessarily exist between the modules, so that the surface of a modular system may have recesses and crevices as well as projecting fasteners preventing efficient cleaning, so that food residues could accumulate and bacterial infestation could occur.

The invention therefore has the objective to provide an improved support column for electronic data terminal equipment, in particular video display screens, touchscreen panels, keyboards and printers of the kinds that are commonly used in connection with retail scales and at point-of-sale terminals. The support column according to the desired improvement should on the one hand be designed as a modular system of building blocks from which a column can be assembled to fit a given situation, but at the same time it should be suitable for use in retail food businesses where sanitary aspects are critical.

SUMMARY

This task is solved by a modular support column with the features according to the independent main claim 1. Further configurations and embodiments of the subject of the invention are presented in the subordinate claims.

A modular support column for data-processing devices such as video display screens, touchscreen panels, keyboards or printers associated with weighing scales and point-of-sale terminals includes a foot module, at least a primary pole module, at least one adapter module to connect one of said data processing devices to the modular support column, mechanical connector elements and fasteners securing the modules to each other, as well as electrical signal- and power-transmitting lines to the data-processing devices. The modular support column in its assembled state has a central axis defining an axial direction. The primary pole module has a first axial end connected to the foot module which, in turn, is connected to a chassis base of a weighing scale, to a table, to a floor, or to a ceiling, and a second axial end connected to the at least one adapter module. According to the invention, the mechanical connector elements and fasteners as well as the electrical signal- and power-transmitting lines to the at least one data-processing device are completely enclosed inside the foot module, the primary pole module, and the at least one adapter module. Furthermore, the modular support column can be extended with one or more extension pole modules and adapter modules carrying one or more further data processing devices, and the connector elements and fasteners associated with the extension pole modules and further adapter modules as well as the electrical signal- and power-transmitting lines to the one or more further data processing devices are likewise completely enclosed in the one or more extension pole modules and adapter modules.

With all of the mechanical connectors completely enclosed inside the modular support column, there are no bolt heads or other fastener elements protruding from the outside surface of any of the modules. Electrical signal- and power lines leading for example from the load-receiving base unit of a weighing scale to a touchscreen panel by way of a foot module, at least one pole module, and an adapter module never leave their completely enclosed passage from the weighing scale base unit to the touchscreen panel. Thus, exposed fasteners and cables, have been removed as an obstacle to meeting sanitary requirements for food equipment according to the U.S. standard NSF/ANSI 2, and the remaining conditions such as an absence of bacteria-collecting crevices and internal angles/corners can now be met through appropriate design choices for the external contour shapes and surface finishes.

In preferred embodiments of the modular support column, the primary pole module and the one or more extension pole modules are configured in the shape of hollow circular cylinders with an outside cylinder radius and an inside cylinder radius. However, the inventive concept could also be realized analogously with other hollow profiles, such as for example a square or hexagonal shape. As will be explained below, a mechanical connector element in the shape of a circular disk of a thickness t and with an outside contour fitting precisely inside the hollow circular cylinders of the pole modules is used in at least some of the internal connections between modules.

In a preferred configuration, the primary pole module has internal projections containing axially directed threaded holes located diametrically opposite each other at the first axial end or foot end of the primary pole module. A foot module can be bolted from below into the axially directed threaded holes in the foot end of the primary pole module. Further, the primary pole module has two internal projections containing axially directed threaded holes located at a radial distance d from the central axis diametrically opposite each other at the second end of the primary pole module. To allow for a disk-shaped connector element of a thickness t to be seated inside the juncture of the primary pole module with another of the aforementioned modules, the internal projections at the second end of the primary pole module are set back by half of the disk thickness t from the second axial end of the pole module.

The extension pole module in a preferred embodiment has two first internal projections located diametrically opposite each other on the internal circumference, set back by half a disk thickness from the first axial end of the extension pole module. The two first internal projections contain axially directed passage holes located at the radial distance d from the central axis. The extension pole module further has two second internal projections set back by half a disk thickness from the second axial end of the extension pole module, and containing axially directed threaded holes located at the radial distance d from the central axis The adapter module can essentially have one of two basic configurations: it can be configured as an end adapter module which is designed to be arranged at the end of the modular support column, or as an intermediate adapter module which is designed to be arranged between the primary pole module and an extension pole module or between the primary pole module and an end adapter module.

An end adapter module has an end surface which, in the assembled state of the modular support column, faces in the axial direction away from the support column, an opposite surface which faces towards the modular support column, a cylindrical recess in the opposite surface and a central axial post with a central axial passage hole inside the cylindrical recess for a fastening screw that is insertable from the end surface through the passage hole. The end adapter module has a partially cylindrical outside surface which is concentric to the cylindrical recess and, in the assembled state of the modular support column, forms a flush continuation of the outside contour of the pole module. The end adapter module further has at least one carrier arm extending perpendicular to the axial direction, which serves to carry one of the data processing devices and to internally contain the enclosed electrical signal- and power-transmitting lines leading to the data processing device.

An intermediate adapter module according to a preferred embodiment of the invention has a central portion configured as a hollow cylinder which, in the assembled state of the modular support column, forms a concentric continuation of the at least one pole module with the same outside and inside cylinder radii as the pole module. The intermediate adapter module further has at least one carrier arm extending perpendicular to the axial direction, which serves to carry one of the data processing devices and to internally contain the enclosed electrical signal- and power-transmitting lines leading to the data processing device.

In a first embodiment of the intermediate adapter, the hollow cylinder of the central portion has a first axial end with two first internal projections containing two axially directed passage holes located diametrically opposite each other at the radial distance d from the central axis. Two second internal projections, which are offset by 90° from the two passage holes in the first internal projections, are set back by half a disk thickness t from a second axial end of the intermediate adapter module and contain two axially directed threaded holes at the radial distance d from the central axis. The central portion further has a set-back step along the outside edge of the first axial end, with an outside radius of the set-back step equal to the inside radius of the primary pole module. Thus, the first end 21 of the intermediate adapter module 20 will precisely align with the second end 12 of the primary pole module 10 without using one of the disk-shaped connector elements.

In an alternative embodiment of the intermediate adapter, the hollow cylinder of the central portion has two first internal projections diametrically opposite each other which are set back by half a disk thickness t from the first axial end of the hollow cylinder and contain axially directed passage holes located at the radial distance d from the central axis. Two second internal projections, which are offset by 90° from the two passage holes in the first internal projections and set back by half a disk thickness t from a second axial end of the intermediate adapter module, contain two axially directed threaded holes at the radial distance d from the central axis. This alternative arrangement requires a disk-shaped connector element at both the first end 21 and the second end 22 of the intermediate adapter module 20.

The completely enclosed path for the electrical signal- and power lines from the hollow vertical cylinder of the pole module out through the carrier arm of the adapter module and into the attached data-processing device is preferably configured as a groove or channel in the carrier arm which, in the assembled state of the modular support column with the supported electronic devices, is closed by a cover.

In preferred embodiments of the invention, the mechanical connector element can essentially have one of two basic configurations: it can be configured as an end connector element which is designed to connect an end adapter module to the second end of a primary pole module, to an extension pole module, or to an intermediate adapter module; or it can be configured as an intermediate connector element designed to connect a pole extension module and an intermediate adapter module to each other. In either case, the disk-shaped mechanical connector element has a passage opening of suitable shape and size for a signal- and/or power cable to be threaded through the opening during assembly of the modular support column.

The end connector element preferably has a threaded hole at the center and two passage holes at diametrically opposite peripheral locations at the radial distance d from the center of the end connector element, so that the end adapter module can be connected to the second end of a primary pole module, an extension pole module or an intermediate adapter module by first fastening the end connector element with two screws to the axially directed threaded holes of the second internal projections of the primary pole module, the extension pole module or the intermediate adapter module pole module and by subsequently fastening the end adapter module with one screw through the passage hole in the central post to the central threaded hole of the end connector element.

The intermediate connector element preferably has two passage holes diametrically opposite each other at the radial distance d from the center of the intermediate connector element, and two threaded holes offset from the passage holes by 90°, so that the extension pole module can be connected to the intermediate adapter module by fastening the intermediate connector element with two screws through the passage holes to the axially threaded holes of the second internal projections at the second axial end of the intermediate adapter module and by subsequently fastening the extension pole module with two screws through the passage holes of its first internal projections to the threaded holes of the intermediate connector element.

In preferred embodiments of the invention, the intermediate adapter module can have a first carrier arm of a cylindrical cross-sectional profile and a second carrier arm of a non-cylindrical, for example square, profile. The cylindrical profile allows an installed electronic device, specifically a display screen or a touch panel, to be tilt-adjusted on the carrier arm. The non-cylindrical carrier arm is preferable for an electronic device that needs to be installed with a prescribed orientation. For example, a printer may be configured as a quick-exchange plug-in module whose electrical connection is closed or interrupted at the same time as the module is, respectively, installed on or removed from the modular support column.

It should be noted that the foregoing concept of connecting the modules to each other imposes an order of sequence on the assembly and a sense of direction on the orientation of the modules as they are joined together. As the mechanical assembly of the modular support column progresses, the electrical signal- and power lines are fed through the pole modules and adapter modules as well as the passage openings in the connector elements. At each adapter module, the appropriate cables or wires are taken out through the carrier arm in order to be subsequently connected to the data-processing device when the latter is mounted on the carrier arm.

BRIEF DESCRIPTION OF THE DRAWINGS

Details of the modular support column according to the invention are explained in the description of the examples that are illustrated in the drawings, wherein.

DETAILED DESCRIPTION

Figure 1:
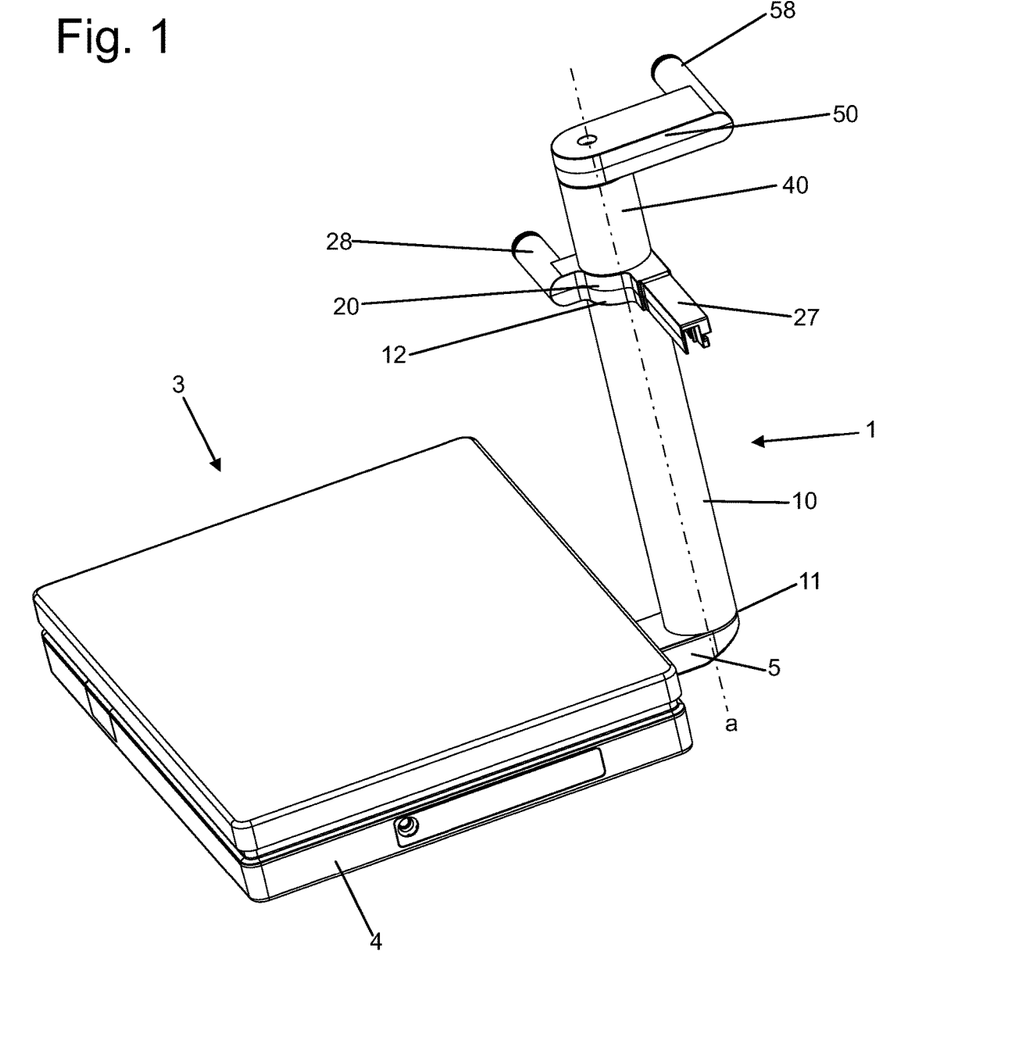
FIG. 1 shows a perspective view of a modular support column according to the invention, in the assembled state, attached to a weighing scale.
Figure 1A:
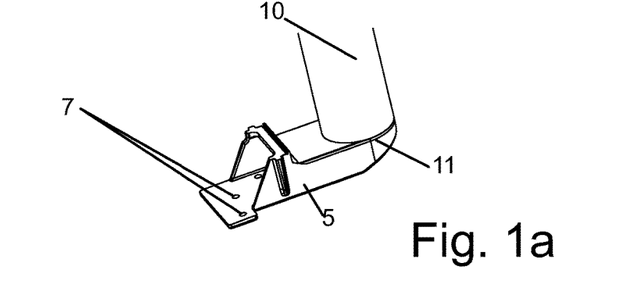
FIG. 1a represents a detail view of the foot module of the support column of FIG. 1.

FIG. 1 shows a perspective view of a modular support column 1 according to the invention, in the assembled state, attached to a weighing scale 3. When the weighing scale 3 is resting on a horizontal surface such as a table or countertop, the axis a of the support column 1 is oriented vertically. In a typical configuration, a foot module 5 of the modular support column 1 is fastened to a chassis base 4 of the weighing scale 3, for example with bolts through the holes 7 that are indicated in an enlarged manner in FIG. 1a. The primary pole module 10 has a foot end 11 connected the foot module 5 and a second end 12 connected to the intermediate adapter module 20. For the connection of the primary pole module 10 to the foot module 5, the foot end 11 of the primary pole module 10 could for example be configured with internal projections with tapped holes (not shown in the drawings). The foot module 5 could have corresponding passage holes (not shown in the drawings) so that the foot module 5 could be bolted from below to the foot end 11 of the primary pole module 10. The intermediate adapter 20 has one carrier arm 27 with a substantially rectangular cross-sectional profile and another carrier arm 28 with a substantially round profile. The modular support column 1 in the embodiment of FIG. 1 is extended beyond the intermediate adapter module 20 with an extension pole module 40 which, in turn, is capped by an end adapter module 50 with a carrier arm 58. The internal mechanical connections between the modules as well as the internal conduit path for power- and signal-transmitting lines through the modules and out through the carrier arms will hereinafter be explained in more detail.

Figure 2:
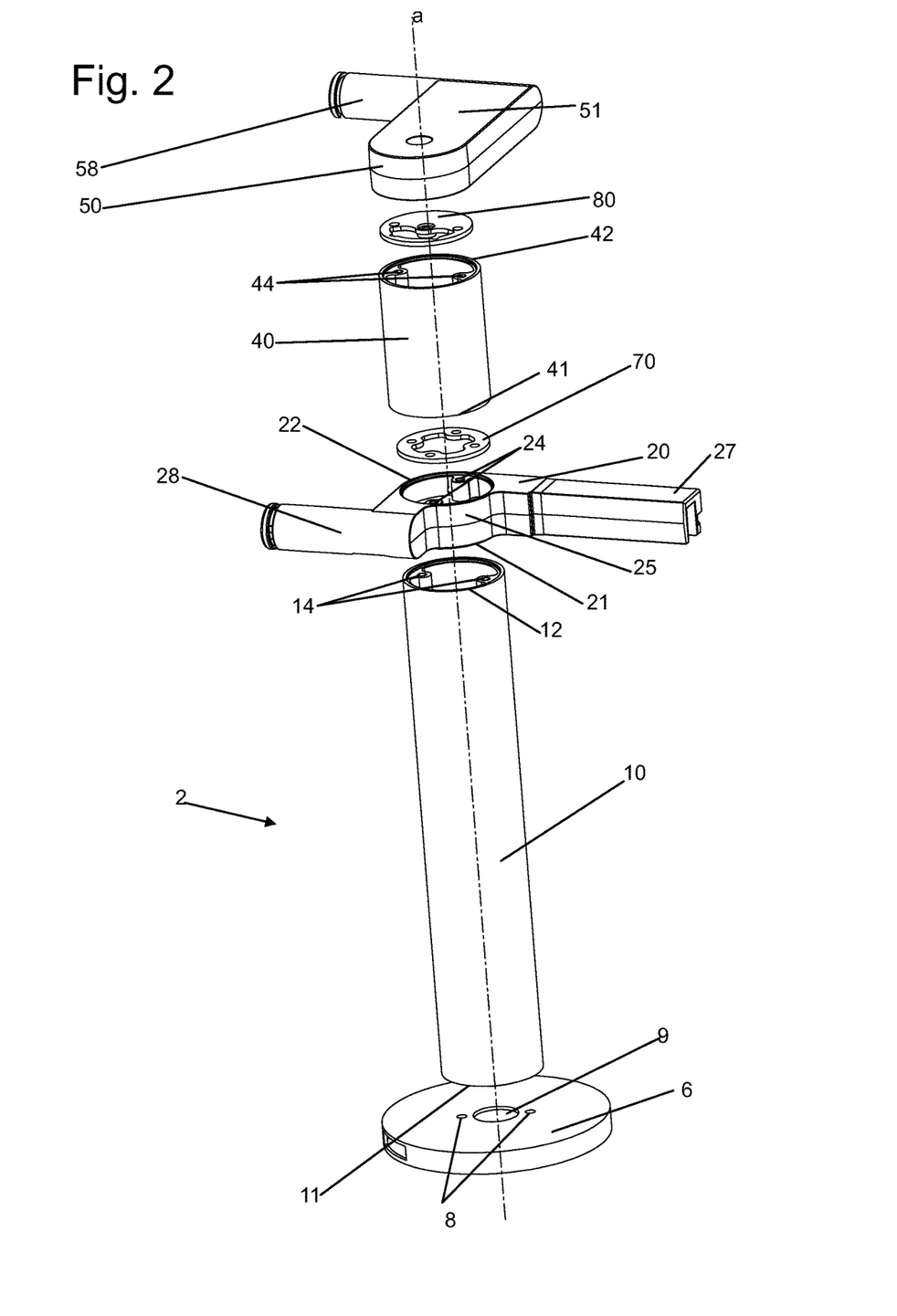
FIG. 2 represents an exploded view of the modular support column, with a foot module for free-standing installation on a table or store counter surface.

The modular support column 2 in the exploded view of FIG. 2 is identical to the modular support column 1 of FIG. 1 with the exception of the foot module 6, which is designed for a free-standing installation of the column 2 on a table or countertop. If the foot end 11 of the primary pole module 10 is configured with internal projections with tapped holes as described above, the foot module 6 can be fastened to the primary pole module 10 with screws inserted from below through the two passage holes 8. The central opening 9 of the foot module 6 provides an open passage for the power- and signal-transmitting lines which would be introduced from below through an appropriate passage hole in the table or countertop.

Two internal projections 14 with tapped holes which are visible inside the second end 12 of the primary pole module 10 serve to connect the latter to the first axial end 21 of the central portion 25 of the intermediate adapter module 20. At the second axial end 22 of the central portion 25, two second internal projections 24 with tapped holes inside the central portion 25 serve to fasten the intermediate disk-shaped connector element 70 which, in turn, connects to the first end 41 of the extension pole module 40. The details of the connections of the intermediate adapter 20 to the primary pole module 10 and the extension pole adapter 40 are explained in the context of FIGS. 3a and 3b.

Inside the second axial end 42 of the extension pole module 40, two second internal projections 44 with tapped holes are visible, which serve to fasten the disk-shaped connector element 80 which, in turn, connects to the end adapter module 50. The two second internal projections 44 are set back from the axial end 42 by half the thickness t of the end connector element 80, so that the installed end connector element 80 will protrude by t/2 from the second axial end 42. The details of the connection of the extension pole module 40 to the end adapter module 50 will be explained in the context of FIGS. 4a and 4b.

Figure 3A:
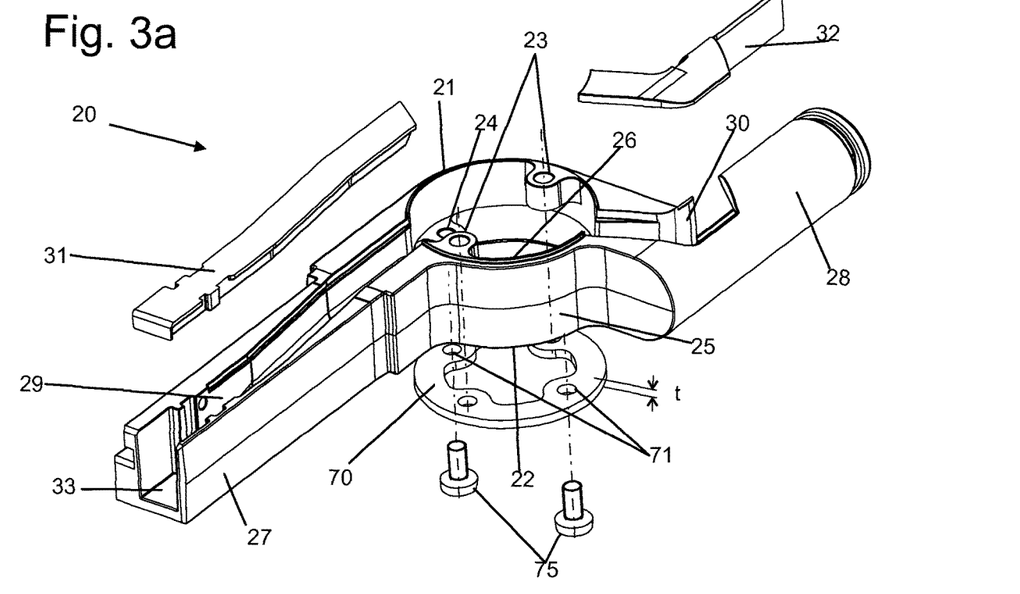
FIG. 3a shows an intermediate adapter module, with the view directed at the first axial end of the hollow cylinder portion.

FIG. 3a shows an exploded view of an intermediate adapter module 20 with the carrier arms 27, 28, wherein the view is directed at the first axial end 21 of the hollow cylinder portion 25, i.e. at the underside of the intermediate adapter module 20 of FIGS. 1 and 2. The carrier arms 27, 28 contain channels 29, 30 through which electrical power- and signal-transmitting cables are routed to the data-processing devices that will be installed on the carrier arms 27, 28. The covers 31, 32 are snapped into place to close up the channels 29, 30. Two first internal projections 23 with passage holes at diametrically opposite locations at the first axial end 21 of the hollow cylinder portion 25 serve to fasten the intermediate adapter module 20 to the second internal projections 14 of the primary pole module 10 which are shown in FIG. 2. When joining the intermediate adapter module 20 to the primary pole module 10 in the process of assembling the modular support column 1, 2, the ring-shaped projection 26 along the perimeter of at the first end 21 of the hollow cylinder portion 25 fits into the second end 12 of the primary pole module 10 and serves to precisely align the intermediate adapter module 20 with the primary pole module 10.

Figure 3B:
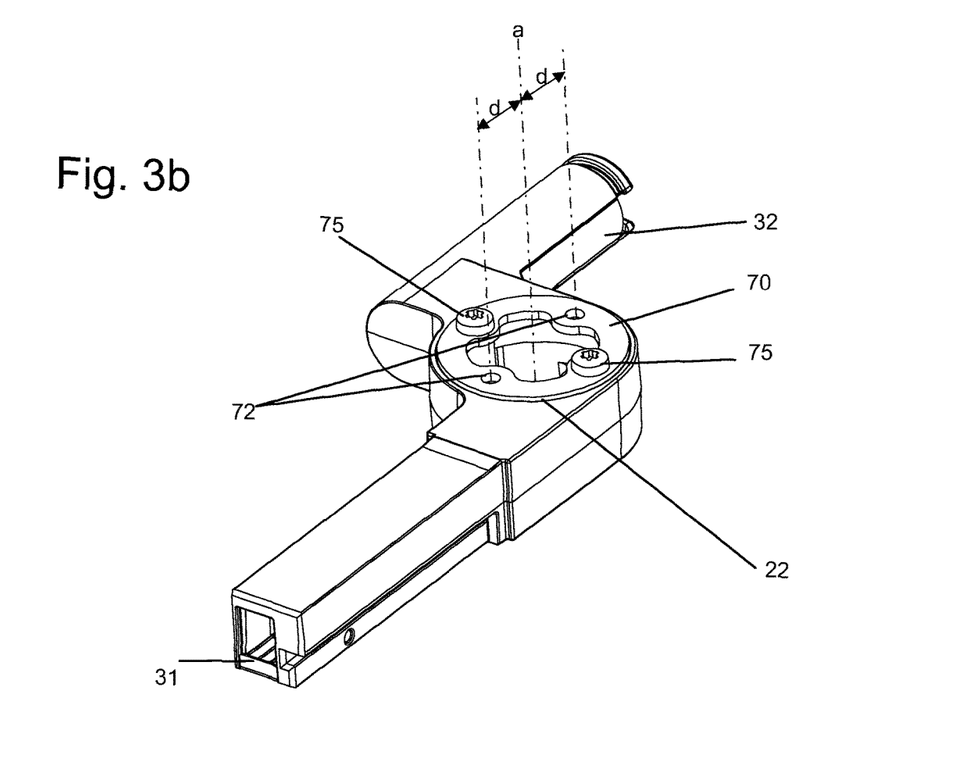
FIG. 3b shows an intermediate adapter module, with the view directed at the second axial end of the hollow cylinder portion.

Also visible inside the hollow cylinder portion 25 is one of the second internal projections 24 with threaded holes, which are located at the second end 24 of the hollow cylinder portion 25, offset by 90° from the first internal projections 23. The second internal projections 24 are set back from the second end 22 by half the thickness t of the disk-shaped intermediate connector element 70. The connector element 70, which is partially visible in FIG. 3a fits precisely into the hollow cylinder portion 25 and can be fastened to the second internal projections 24 by means of screws 75, as is also shown in FIG. 3b where the view is directed at the topside of the intermediate adapter 20.

Figure 4A:
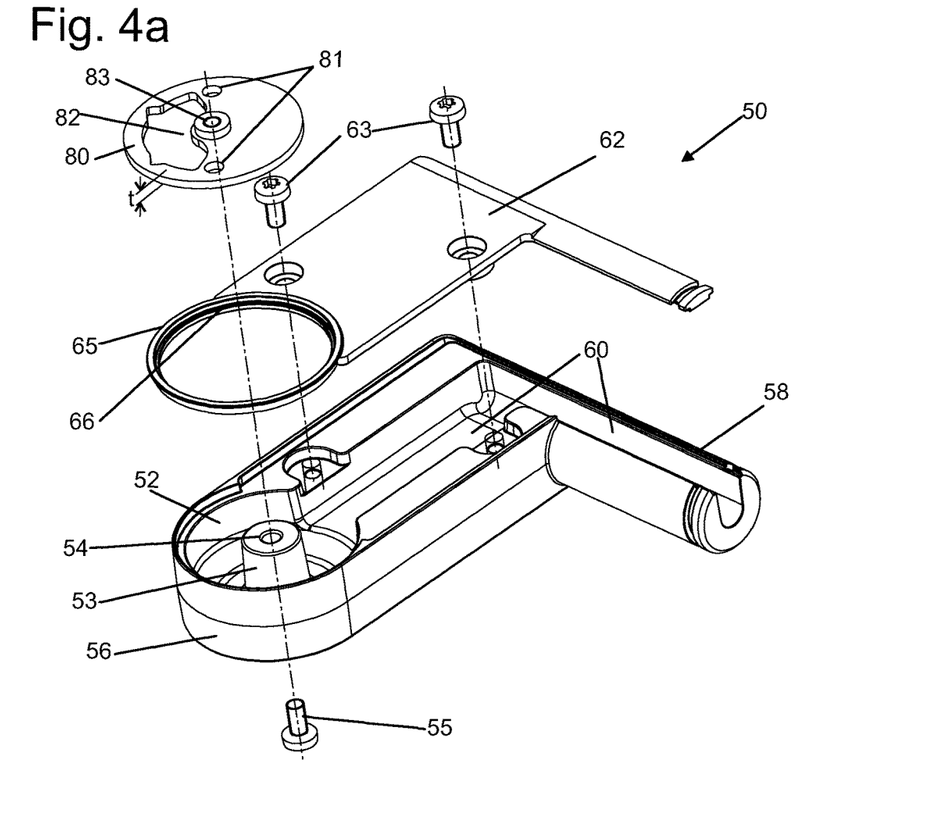
FIG. 4a shows the underside of an end adapter module.
Figure 4B:
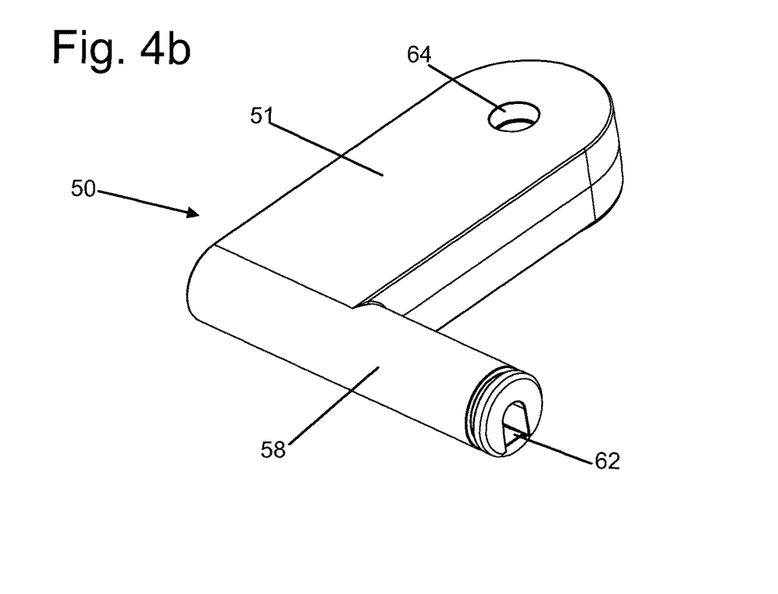
FIG. 4b shows the end adapter module of FIG. 4a with the view directed at the end surface.

FIG. 4a shows an exploded view of an end adapter module 50 with the carrier arm 58, wherein the view is directed at the underside of the end adapter module 50 of FIGS. 1 and 2. In the sequence of assembling the modular support column 1, 2, the disk-shaped end connector element 80 is set into the second end 42 of the extension pole module 40 (see FIG. 2) after the signal/power lines have been fed through the passage opening 82 of the end connector element 80. With screws inserted through the passage holes 81, the end connector element 80 is fastened to the threaded holes in the second internal projections 44 of the extension pole module 40. Next, the signal/power lines are dressed through the angled channel 60, whereupon the latter is closed up by setting the cover 62 in place and securing it with the screws 63. The end adapter module 50 is turned over into the position shown in FIG. 4b. The ring portion 65 of the cover 62 has an internal step 66 that is recessed by half of the thickness t of the end connector element 80. Thus, when the end adapter module 50 is joined to the extension pole module 40, the connector element 80 will be equally engaged to a depth of t/2 in both the extension pole module 40 and end adapter module 50, so that the modules 40 and 50 are precisely aligned with each other. With a screw 55 inserted through the passage hole 54 of the end adapter module 50 into the threaded hole 83 at the center of the end connector element 80, the end adapter module 50 is secured on the modular support column 1, 2. The connection of the end adapter module 50 to the rest of the support column 1, 2 by means of a single axial screw 55 allows the end adapter module 50 with the attached data processing device to be swiveled in any desired direction.

Figure 5:
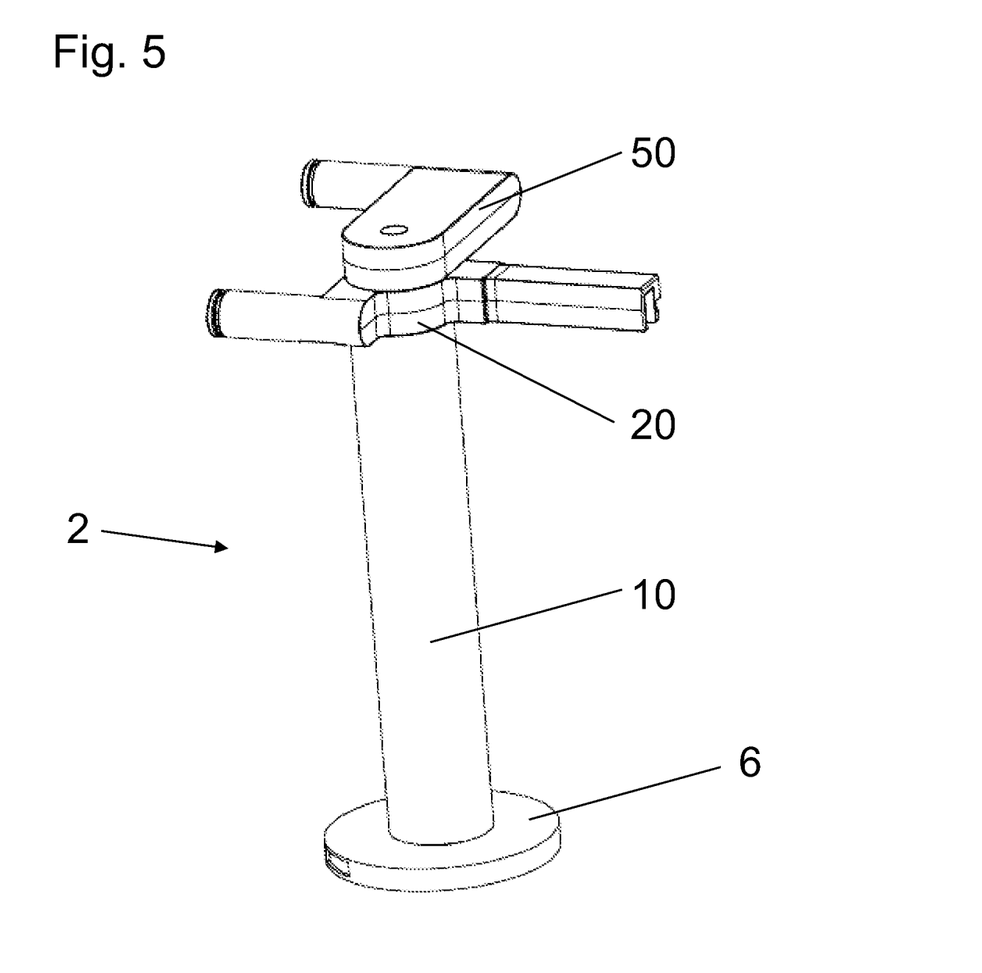
FIG. 5 illustrates an alternative configuration of the modular support column of FIG. 2.

FIG. 5 shows an alternative configuration of the modular support column 2, where the extension pole module 40 has simply been omitted. This is possible, because the intermediate connector element 70 and the end connector element 80 have the same diameter and thickness, so that upward from the intermediate adapter 20, the column can either be continued with the intermediate connector element 70 and the extension pole module 40, or with the end connector element 80 and the end adapter module 60.

Although the invention has been described through the presentation of specific examples, it will be evident to the reader that numerous further variant embodiments could be developed from the teachings of the present invention, e.g. by combining the features of the individual embodiments with each other or by interchanging individual functional units of the individual embodiments against each other. As an example, the intermediate adapter module 20 could be configured so that it could be connected to the primary pole module 10 by means of an intermediate connector element 70, in the same way as the extension pole module 40 is connected to the intermediate adapter module 20. Likewise, the foot end 11 of the primary pole module 10 and the foot module 5, 6 could be configured so that they could be connected to each other by way of an intermediate connector element 70. Also, it should be emphasized that the invention is not limited to the shapes and proportions of the elements shown in the drawings, but that the inventive concept could be fully realized with shapes and proportions different from those shown in the illustrations.

What is claimed is:

1. A device for supporting one or more data-processing devices associated with a weighing scale or a point-of-sale terminal, wherein the data-processing devices, each having electrical signal- and power-transmitting lines, include at least one of: a video display screen, a touchscreen panel, a keyboard and a printer, the device comprising:

a foot module, adapted for connection to one of: a chassis base of a weighing scale, a table, a floor or a ceiling;

at least one adapter module, each adapter module adapted to connect one of the data processing devices to the device;

a primary pole module and, optionally, one or more extension pole modules, the primary pole module having, in an assembled condition, a first axial end thereof connected to the foot module and a second axial end thereof connected to one of the at least one adapter modules or at least one of the extension pole modules, wherein each of the pole modules, whether a primary pole module or an extension pole module, is configured in the shape of hollow circular cylinder with an outside cylinder radius and an inside cylinder radius;

mechanical connector elements and fasteners that secure the respective foot module, adapter modules and pole modules to each other in the assembled condition to provide a support column having a continuous central axis that defines an axial direction, wherein the mechanical connector elements, the fasteners and the electrical signal- and power-transmitting lines are enclosed completely inside the support column, wherein each mechanical connector element is configured as a circular disk having a disk thickness, an outside contour sized to fit precisely into the hollow circular cylinder, and a cutout passage for the signal- and power-transmitting lines; and wherein the primary pole module further comprises two first internal projections containing axially directed threaded holes located diametrically opposite each other at the first axial end thereof and two second internal projections located diametrically opposite each other, set back by one-half of the disk thickness from the second axial end thereof, the second internal projections containing axially directed threaded holes located at a radial distance from the central axis.

2. The device of claim 1, wherein:
each extension pole module further comprises two first internal projections located diametrically opposite each other on the internal circumference thereof, set back by one-half of a disk thickness from the first axial end thereof and containing axially directed passage holes located at the radial distance from the central axis, and two second internal projections, offset by 90° from the first internal projections, set back by one-half a disk thickness from the second axial end thereof and containing axially directed threaded holes located at the radial distance from the central axis.

3. The device of claim 1, wherein:
the at least one adapter module is configured as an end adapter module at an end of the modular support column to close off the end, the end adapter module comprising:
an end surface which, in the assembled state of the modular support column, faces in the direction axially away from the support column, a surface opposite the end surface facing towards the modular support column;
a cylindrical recess in the opposite surface;
a central axial post with a central axial passage hole inside the cylindrical recess, the passage hole sized to receive therethrough a fastening screw inserted from the end surface;
a partially cylindrical outside surface which, in the assembled state of the modular support column, forms a flush continuation of the outside contour of the pole module, and at least one carrier arm that extends perpendicular to the axial direction, the carrier arm adapted to carry one of the data processing devices and to internally contain the enclosed electrical signal- and power-transmitting lines leading to the data processing device.

4. The device of claim 3, wherein:
the at least one carrier arm of the at least one adapter module comprises:
a channel that is sized and adapted to contain the electrical signal- and power-transmitting lines leading to the data processing device; and
a cover that, in the assembled state of the modular support column, closes the channel.

5. The device of claim 4, wherein:
the at least one mechanical connector element is configured as an end connector element for connecting an end adapter module to at least one of: the second end of a primary pole module, the second end of an extension pole module, or an intermediate adapter module, the end connector element having a threaded hole at a center thereof and two passage holes at diametrically opposite peripheral locations at the radial distance from the center of the end connector element, such that the end adapter module is fastened by first securing the end connector element with two screws to the axially threaded holes of the second internal projections of the primary pole module, or of the second internal projections of the extension pole module, or of the second internal projections of the intermediate adapter module and subsequently fastening the end adapter module with one screw through the passage hole in the central post to the central threaded hole of the end connector element.

6. The device of claim 4, wherein:
the at least one connector element is configured as an intermediate connector element for connecting a pole extension module to an intermediate adapter module, the intermediate connector element having:
two passage holes for fastening screws diametrically opposite each other at the radial distance from the center of the intermediate connector element; and
two threaded holes, offset from the passage holes by 90°, such that the extension pole module is connected to the intermediate adapter module by fastening the intermediate connector element with two screws through the passage holes to the threaded holes in the second internal projections at the second axial end of the intermediate adapter module and subsequently fastening the extension pole module to the intermediate connector element with two screws through the passage holes in the first internal projections of the extension pole module to the threaded holes of the second internal projections of the intermediate connector element.

7. The device of claim 1, wherein:
the at least one adapter module is configured as an intermediate adapter module arranged between the primary pole module and one of: an extension pole module or an end adapter module, the intermediate adapter module further comprising:
a central portion, configured as a hollow cylinder, that in the assembled modular support column, forms a concentric continuation of the at least one pole module with the same outside and inside cylinder radii as the pole module; and at least one carrier arm that extends perpendicular to the axial direction and is adapted to carry one of the data processing devices and to internally contain the enclosed electrical signal- and power-transmitting lines leading to the data processing device.

8. The device of claim 7, wherein:

the central portion has two first internal projections, diametrically opposite each other on the internal circumference of the hollow cylinder, set back by half a disk thickness from a first axial end of the hollow cylinder and containing axially directed passage holes located at the radial distance from the central axis, and the intermediate adapter module has two second internal projections offset by 90° from the first internal projections, set back by one-half a disk thickness from a second axial end of the hollow cylinder and containing axially directed threaded holes located at the radial distance from the central axis.

9. The device of claim 7, wherein:

the central portion has a ring-shaped projection along a perimeter of the first axial end, such that an outside radius of the ring-shaped projection equals the inside radius of the primary pole module, and the central portion further has two first internal projections containing two axially directed passage holes located diametrically opposite each other at the radial distance from the central axis, and the intermediate adapter module has two second internal projections offset by 90° from the two passage holes in the first internal projections, set back by half a disk thickness from a second axial end of the intermediate adapter module and containing two axially directed passage holes at the radial distance from the central axis.

10. The device of claim 7, wherein:

the at least one carrier arm of the at least one adapter module comprises:
- a channel that is sized and adapted to contain the electrical signal- and power-transmitting lines leading to the data processing device; and
- a cover that, in the assembled state of the modular support column, closes the channel.

11. The device of claim 1, wherein:

the at least one mechanical connector element is configured as an end connector element for connecting an end adapter module to at least one of: the second end of a primary pole module, the second end of an extension pole module, or an intermediate adapter module, the end connector element having a threaded hole at a center thereof and two passage holes at diametrically opposite peripheral locations at the radial distance from the center of the end connector element, such that the end adapter module is fastened by first securing the end connector element with two screws to the axially threaded holes of the second internal projections of the primary pole module, or of the second internal projections of the extension pole module, or of the second internal projections of the intermediate adapter module and subsequently fastening the end adapter module with one screw through the passage hole in the central post to the central threaded hole of the end connector element.

12. The device of claim 1, wherein:

the at least one connector element is configured as an intermediate connector element for connecting a pole extension module to an intermediate adapter module, the intermediate connector element having:
- two passage holes for fastening screws diametrically opposite each other at the radial distance from the center of the intermediate connector element; and
- two threaded holes, offset from the passage holes by 90°, such that the extension pole module is connected to the intermediate adapter module by fastening the intermediate connector element with two screws through the passage holes to the threaded holes in the second internal projections at the second axial end of the intermediate adapter module and subsequently fastening the extension pole module to the intermediate connector element with two screws through the passage holes in the first internal projections of the extension pole module to the threaded holes of the second internal projections of the intermediate connector element.

13. The device of claim 1, wherein:

the at least one adapter element comprises at least one carrier arm with a cylindrical cross-sectional profile that allows an electronic device installed thereon to be tilt-adjusted.

14. The device of claim 1, wherein:

the at least one adapter element comprises at least one carrier arm with a non-cylindrical cross-sectional profile that requires a prescribed orientation of an electronic device in order to install.

* * * * *